2,773,822

PHOTOPOLYMERIZATION INITIATORS

Roland J. Kern, Dayton, Ohio, assignor to Monsanto Chemical Company, St. Louis, Mo., a corporation of Delaware No Drawing. Application September 24, 1953, Serial No. 382,209

17 Claims. (Cl. 204—158)

This invention relates to photopolymerization of unsaturated organic compounds. In specific aspects, the invention pertains to new photosensitizers for the photopolymerization of acrylonitrile, methacrylonitrile, styrene, and the lower alkyl acrylates and methacrylates.

The essence of this invention resides in the use of mercapto-Ar-thiazoles, -oxazoles, and -imidazoles, as sensitizers for photopolymerization ("Ar" means arylene). These sensitizers can be described by the following general formula

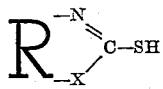

where R is an ortho arylene radical and where X is S, O, or NH.

In accordance with preferred aspects of the invention, one or more of the monomers acrylonitrile, methacrylonitrile, styrene, and the lower alkyl acrylates and methacrylates, is subjected to the polymerizing influence of light in the ultraviolet range while having dispersed in said monomer a small amount of a compound of the nature described herein effective to photosensitize, i. e., speed-up, the polymerization. The sensitizers employed according to the invention act to increase the rate of polymerization occurring under the influence of light in the ultraviolet range, and can be termed photosensitizers, photopolymerization catalysts, photopolymerization accelerators, or photopolymerization initiators. Preferably light containing effective amounts of light having wave lengths of 2,000 to 4,000 Angstrom units (A.) is used.

Compounds to be used as photosensitizers in accordance with the invention include mercaptobenzothiazole (2-benzothiazolethiol), mercaptobenzoxazole (2-benzoxazolethiol), and mercaptobenzimidazole (2-benzimidazolethiol), and such compounds substituted with one or more groups that do not prevent the desired initiation of photopolymerization. Among groups that are usually non-interfering can be mentioned by way of example: alkyl, halogen, aryl, cycloalkyl, aralkyl, alkaryl, alkoxy. Particularly preferred groups are alkyl, phenyl, and a benzene ring condensed with a benzene ring of one of the compounds just named resulting in the corresponding naphthiazole, naphthoxazole, or naphthimidazole, respectively. Such alkyl, phenyl, or condensed benzene rings can themselves be further substituted. The following specific compounds are mentioned by way of example: 2-mercapto benzothiazole (commonly called MBT), 2-mercapto-4-phenyl benzothiazole, 2-mercapto benzoxazole, 2-mercapto-4-methyl benzoxazole, 2-mercapto naphthoxazole, 2-mercapto-6-ethoxy benzothiazole, 2-mercapto benzimidazole, 2-mercapto naphthimidazole, 2-mercapto-4-tolyl benzimidazole, 2-mercapto-4-methyl-6-t-amyl-benzimidazole, 2-mercapto-5-chlorobenzoxazole, 2-mercapto-4-cyclohexylbenzothiazole, and the various analogues and homologues thereof.

The foregoing list of specific compounds suitable for use in the invention is given by way of example. Further, by way of example, as atoms or groups that are normally non-interfering and which can be substituted on the arylene radical can be mentioned methyl, isobutyl, chloro, bromo, cyclohexyl, methylcyclopentyl, butoxy, naphthyl, benzyl, phenyl, tolyl, and the like. A single compound can contain two or more non-interfering groups that are the same or different. Preferably, the arylene radical is substituted with not more than four substituents in addition to the aromatic ring or rings thereof. Preferred substituents are those groups that are electron-releasing, e. g., alkyl, alkoxy, as in many instances they enhance the polymerization initiating effect of the parent compound. Although compounds containing on the aromatic ring electron-attracting groups, e. g., nitro, can be used, they are not preferred because such groups usually tend to reduce the polymerization initiating effect of the parent compound. Organic substituents on the arylene nucleus should preferably contain from 1 to 6 carbon atoms. It will be understood that the term "arylene" as used herein without modification, is generic to both unsubstituted and substituted arylene nuclei.

The quantity of a mercapto-Ar-thiazole, a mercapto-Ar-oxazole, or a mercapto-Ar-imidazole, to be used as photosensitizer will, of course, be dependent upon many variables, including the particular compound or mixture of compounds used as photosensitizer, the wave length of ultraviolet light employed, the intensity of light employed, the time of irradiation, the monomer or monomers present, and the temperature. In any event, the amount of added thiazole, oxazole, or imidazole of the types described herein, is small, but sufficient is employed to be effective as a photosensitizer. This small but catalytic amount is usually within the range of from 0.01 to 5 weight percent based upon the amount of monomeric material initially present. It will seldom be necessary to employ more than 1 or 2 weight percent of the added photosensitizer and no more than 0.1 weight percent is in most instances sufficient to obtain a good polymerization rate.

Conditions of temperature and pressure at which the photopolymerization is effected can be varied over a wide range. It will be understood that optimum conditions will be greatly dependent upon the particular monomeric material being polymerized. Many photopolymerizations are readily effected at temperatures of from 0° C. to 150° C. when the monomer is exposed to a light source rich in ultraviolet light. The present knowledge of the art on photopolymerizations is sufficient to permit choice of suitable operating conditions for any particular monomer, and simple tests can be run if necessary to determine the conditions most suitable for any particular system. At a given temperature, the practice of my invention makes possible a more rapid photopolymerization than is effected in the absence of my added photosensitizer.

Any suitable source of radiation providing wave lengths in the ultraviolet range, preferably within the range of 2,000 to 5,000 Angstrom units and still more preferably within the range of 2,000 to 4,000 A., can be used. Common sources include mercury lamps and arcs, carbon arcs, and hydrogen discharge tubes. Of course, sunlight also contains substantial amounts of ultraviolet radiation and can be used if desired. Radiation of sufficient intensity from tungsten lamps can be employed. In any event, light within the ultraviolet range of sufficient intensity and for a sufficient time is used to effect the desired extent of polymerization, which can be very small, for example 1 percent of the monomer polymerized, but which, for practical reasons, should be considerably larger.

The vessel in which the polymerization is conducted should be transparent to light of the desired wave length so that the light can pass through the sides of the container. Suitable glasses are available commercially, and include borosilicate ("Pyrex"), "Vycor," or soft glass. Alternatively, the source of light can be placed directly over the surface of the monomer in a container, or can be placed within the reaction mixture itself.

While the photopolymerization is usually conducted in mass, i. e., in a system wherein the only components of the reaction mixture are the monomer (or monomers) plus the photoinitiator (together with other polymerization initiators and catalysts if desired), the invention is more broadly applicable to all types of polymerization techniques. For example, an added organic solvent for monomer and/or polymer can be present, such as benzene, aliphatic hydrocarbons, ethanol, methanol. Further, the polymerization can be effected by the well-known suspension and emulsion techniques. In the former the monomeric material, preferably already containing the compound chosen as photosensitizer, is suspended in the form of small particles in a non-solvent liquid, such as water, an added suspending agent such as starch, carboxymethylcellulose, phosphates, vinyl acetate-maleic anhydride copolymer, or the like being present to aid in maintaining the particles separate one from another; during the polymerization the particles tend to grow in size. Emulsion polymerization is similar with the exception that added emulsifying agents are used and the particle size is much smaller so that a stable aqueous emulsion of polymer is the end product of the polymerization. In this instance also it is preferred to dissolve the catalyst in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary alkyl mercaptans. It is generally preferred that free oxygen be absent during the polymerization.

In view of my discovery of the photosensitizing action of the class of thiols described herein in photopolymerizations of a variety of unsaturated organic compounds, it will be apparent that the invention broadly covers the use of any of these "azole" thiols effective to accelerate the polymerization of any monomeric material. There will, of course, be monomers and thiols of the type described herein that are not effective, but those skilled in the art, having had the benefit of the present disclosure, can readily determine by obvious simple tests suitable monomers and thiols of the type described herein to be employed. It can be pointed out by way of example that the photopolymerization of vinyl acetate is not catalyzed by these compounds at the conditions of Example 4, and the photopolymerization of methacrylonitrile is catalyzed by mercaptobenzimidazole but is not by mercaptobenzothiazole or by mercaptobenzoxazole at the conditions of Example 6. The preferred monomers are acrylonitrile, methacrylonitrile, styrene, and the lower alkyl acrylates and methacrylates. By the term, "lower alkyl acrylates and methacrylates," I include, for example, methyl, ethyl, isopropyl, n-propyl, n-butyl, sec.-butyl, tert.-butyl, and the various amyl and hexyl acrylates, and the same methacrylates, in particular. However, other lower alkyl acrylates and methacrylates containing a greater number of carbon atoms, for example, up to 8 or 10 carbon atoms, in the alkyl group, fall within the broad scope of the invention.

The monomeric material can be any monomeric material whose photopolymerization is accelerated by a compound of the type described herein. The monomeric material can be a single monomer or a mixture of monomers. Thus, the monomeric material preferably is one of the monomers specifically mentioned hereinabove or a mixture of monomers containing one or more of said monomers specifically mentioned hereinabove. Thus, the monomeric material can consist of a single monomer, e. g., styrene, or methyl methacrylate, in which case a homopolymer is formed. Or, a copolymer can be formed by subjecting to photopolymerization a mixture of monomers, e. g., styrene plus methyl methacrylate or styrene plus some other ethylenically unsaturated monomer copolymerizable therewith.

The purity of monomer may have a marked effect upon the polymerization rate. Thus, it is ordinarily preferred that the polymerization be effected with freshly distilled monomer, and also in the absence of air. Various of the compounds described will differ in the extent to which they are affected by monomer purity, choice of monomer, and conditions of reaction. The invention encompasses the use of those compounds effective to photosensitize, i. e., increase the rate of the polymerization, of a given monomeric unsaturated organic compound under the influence of light in the ultraviolet range with a suitable combination of reaction conditions, including monomer purity and quantity of added photosensitizer.

The following examples illustrate some preferred aspects of the invention but are not to be taken as exhaustive of the broad scope thereof.

EXAMPLES

Photopolymerization tests were made by sealing under nitrogen in a "Pyrex" glass tube 20 ml. of the chosen monomer, together with 0.02 gram of the chosen compound to be tested. With each monomer a blank was run in which the same quantity of monomer was sealed in the tube without any of the added compound. The tubes were equally irradiated by a General Electric B–H–4 ultraviolet lamp (a mercury vapor bulb giving light rich in the ultraviolet range) at a distance of 1 to 2 inches, the tubes being held at about 40° C. to 45° C. during irradiation. The irradiation time was varied with the different monomers in accordance with previous experience indicating a desirable time for tests of this nature.

After the given polymerization period each tube was opened, the weighed contents precipitated in excess methanol, filtered, washed with methanol or hexane, dried and weighed again to determine the amount of polymer formed, whereby the weight percent of monomer charged that had been converted to polymer was obtained. In some instances a quantitative separation and determination was not made where visual observation was sufficient to determine the effect of the added compound on the polymerization. The specific viscosities were determined on a 0.1 weight percent polymer solution in toluene unless otherwise noted.

*Example 1*

Methyl methacrylate was subjected to photopolymerization in the manner described above. The polymerization period was 5 hours. The weight percent conversion to polymer was determined in each case. Specific viscosity of each of the isolated polymers was determined by measurement on a solution of 0.1 weight percent polymer in acetone. These viscosity determinations showed that marked differences in polymer molecular weights were obtained, depending upon the particular photosensitizer used.

| Material | Conversion, Weight Percent | Specific Viscosity |
|---|---|---|
| Blank | 4 | 0.20 |
| 2-benzimidazolethiol | 16 | 0.095 |
| 2-benzothiazolethiol | 13 | 0.051 |
| 2-benzoxazolethiol | 9 | 0.108 |

With a different batch of methyl methacrylate monomer, similar tests were made to determine the effect of 2-benzimidazolethiol and 2-benzoxazolethiol on the photopolymerization of methyl methacrylate. In this instance, the blank gave 8 percent conversion in 4 hours, the 2-benzoxazolethiol gave 29 percent conversion in 4 hours, and the 2-benzimidazolethiol gave 75 percent conversion in 1 hour.

Comparison of the data set forth in the table above, and the date in the preceding paragraph, show that marked differences in the rate of polymerization may be exhibited with different batches of the same monomer differing somewhat in amount and/or type of impurity.

*Example 2*

Photopolymerization of methyl acrylate was effected in the manner described above. The polymerization was stopped after the indicated time for the respective initiators, and the specific viscosity determined on the recovered polymer.

| Material | Rate of Conversion | Specific Viscosity |
|---|---|---|
| Blank | solid in 6 hours | 1.49 |
| 2-benzimidazolethiol | solid in 1 hour | 0.78 |
| 2-benzothiazolethiol | solid in 3 hours | 0.19 |
| 2-benzoxazolethiol | solid in 5 hours | 0.69 |
| 6-ethoxy-2-mercaptobenzothiazole | 95% in 3 hours | |

*Example 3*

Tests on photopolymerization of styrene monomer were made as described above. The polymerization period was 24 hours. The specific viscosities were determined on a 0.1 weight per cent polymer solution in toluene.

| Material | Conversion, Weight Percent | Specific Viscosity |
|---|---|---|
| Blank | 8 | .20 |
| 2-benzimidazolethiol | 11 | .19 |
| 2-benzothiazolethiol | 12 | .027 |
| 2-benzoxazolethiol | 12 | .073 |
| 6-ethoxy-2-mercaptobenzothiazole | 12 | .068 |

*Example 4*

The photopolymerization of vinyl acetate was attempted, using 2-benzimidazolethiol, 2-benzothiazolethiol, 2-benzoxazolethiol, and 6-ethoxy-2-mercaptobenzothiazole. The radiation period was 16 hours. Neither the blank (containing nothing but vinyl acetate sealed under nitrogen), nor the vinyl acetate containing the materials named, yielded any polymer. The samples were poured into hexane, rather than methanol, in an attempt to precipitate any polymer present.

*Example 5*

Data on photopolymerization of acrylonitrile, determined as described above, are:

| Material | Conversion, Weight Percent | Time, Hours |
|---|---|---|
| Blank | 0 | 3 |
| 2-benzimidazolethiol | 9 | 3 |
| 2-benzothiazolethiol | 0.7 | 3 |
| 2-benzoxazolethiol | 2.3 | 3 |

*Example 6*

Photopolymerization of methacrylonitrile was carried out in the manner described above. However, polymer formed was not recovered and weighed, but rather visual observations on the samples were made. Methacrylonitrile polymerizes in a rather unusual manner under these coiditions, in that polymer formed seems to be insoluble in the monomer and accumulates at the bottom of the tube. Thus, the tube contains a clear liquid plus a layer of solid at the bottom of the tube.

In these tests, the polymerization period was 24 hours. At the end of that time the blank (tube containing only methacrylonitrile with no added initiator) contained a small amount of white polymer. The tube to which 2-benzothiazolethiol had been added appeared to contain about the same quantity of polymer as the blank. The tube to which 2-benzoxazolethiol had been added also appeared to contain about the same quantity of polymer as the blank. However, the tube to which 2-benzimidazolethiol had been added appeared to contain about three times as much polymer as the blank.

The foregoing data demonstrate effective photosensitizing action of a variety of the compounds of the type described herein with a variety of monomers. The data also demonstrate that the mercapto-Ar-imidazoles are preferred photoinitiators of the present invention, in that they generally give the most rapid polymerizations and give the highest molecular weight polymers as determined by the specific viscosities of the polymers.

While the invention has been described herein with particular reference to various preferred embodiments thereof, and examples have been given suitable materials, proportions and conditions, it will be appreciated that variations from the details given herein can be effected without departing from the invention.

I claim:

1. In the photopolymerization of an ethylenically unsaturated monomer, the improvement which comprises employing a small amount of a compound having the general formula

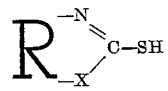

where R is an ortho arylene radical and X is selected from the group consisting of S, O, and NH, effective to photosensitize said polymerization.

2. In the photopolymerization of an ethylenically unsaturated monomer, the improvement which comprises employing a small amount of a mercapto-arylene-imidazole effective to photosensitize said polymerization.

3. In the photopolymerization of an ethylenically unsaturated monomer, the improvement which comprises employing a small amount of a mercapto-arylene-thiazole effective to photosensitize said polymerization.

4. In the photopolymerization of an ethylenically unsaturated monomer, the improvement which comprises employing a small amount of a mercapto-arylene-oxazole effective to photosensitize said polymerization.

5. A process according to claim 1 wherein said compound is employed in an amount within the range of from 0.01 to 1.0 weight percent of the monomer.

6. A process according to claim 1 wherein said monomer is selected from the group consisting of acrylonitrile, methacrylonitrile, styrene, and the lower alkyl acrylates and methacrylates.

7. A process which comprises admixing with a monomeric material comprising a monomer selected from the group consisting of acrylonitrile, methacrylonitrile, styrene, and the lower alkyl acrylates and methacrylates, a small amount less than 1 weight percent of a compound having the general formula

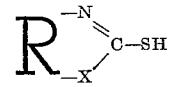

where R is an ortho arylene radical and X is selected from the group consisting of S, O, and NH, effective as photopolymerization sensitizer for said monomeric material, and subjecting the resulting admixture to the photopolymerizing effect of radiation within the range of from 2,000 to 4,000 Angstrom units of sufficient intensity for a sufficient time to polymerize at least a portion of said monomer.

8. A process according to claim 7 wherein said monomer is methyl methacrylate.

9. A process according to claim 7 wherein said monomer is methyl acrylate.

10. A process which comprises polymerizing acrylonitrile under the influence of light in the ultraviolet range in the presence of a small amount of a mercaptobenzoimidazole effective to photosensitize said polymerization.

11. A process which comprises polymerizing a lower alkyl methacrylate under the influence of light in the ultraviolet range in the presence of a small amount of a mercaptobenzoimidazole effective to photosensitize said polymerization.

12. A process which comprises polymerizing a lower alkyl acrylate under the influence of light in the ultraviolet range in the presence of a small amount of a mercaptobenzimidazole effective to photosensitize said polymerization.

13. A new use for a 2-benzimidazolethiol which comprises polymerizing an ethylenically unsaturated monomer under the influence of light in the ultraviolet range in the presence of a small amount of a 2-benzimidazolethiol effective to photosensitize said polymerization.

14. A new use for 2-benzimidazolethiol which comprises polymerizing an ethylenically unsaturated monomer under the influence of light in the ultraviolet range in the presence of a small amount of 2-benzimidazolethiol effective to photosensitize said polymerization.

15. A new use for 2-mercapto benzothiazole which comprises polymerizing an ethylenically unsaturated monomer under the influence of light in the ultraviolet range in the presence of a small amount of 2-mercapto benzothiazole effective to photosensitize said polymerization.

16. A new use for 2-mercapto benzoxazole which comprises polymerizing an ethylenically unsaturated monomer under the influence of light in the ultraviolet range in the presence of a small amount of 2-mercapto benzoxazole effective to photosensitize said polymerization.

17. A new use for 6-ethoxy-2-mercapto benzothiazole which comprises polymerizing an ethylenically unsaturated monomer under the influence of light in the ultraviolet range in the presence of a small amount of 6-ethoxy-2-mercapto benzothiazole effective to photosensitize said polymerization.

References Cited in the file of this patent
UNITED STATES PATENTS

| | | |
|---|---|---|
| 2,423,520 | Richards | July 8, 1947 |
| 2,606,868 | Alquist et al. | Aug. 12, 1952 |